United States Patent
Buelow et al.

(10) Patent No.: US 10,109,048 B2
(45) Date of Patent: Oct. 23, 2018

(54) LINKING BREAST LESION LOCATIONS ACROSS IMAGING STUDIES

(71) Applicant: KONINKLIJKE PHILIPS N.V., Eindhoven (NL)

(72) Inventors: Thomas Buelow, Grosshansdorf (DE); Martin Bergtholdt, Hamburg (DE); Rafael Wiemker, Kisdorf (DE); Kirsten Regina Meetz, Hamburg (DE); Joerg Sabczynski, Norderstedt (DE); Dominik Berjamin Kutra, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 94 days.

(21) Appl. No.: 14/893,679

(22) PCT Filed: Jun. 20, 2014

(86) PCT No.: PCT/EP2014/063018
§ 371 (c)(1),
(2) Date: Nov. 24, 2015

(87) PCT Pub. No.: WO2014/206881
PCT Pub. Date: Dec. 31, 2014

(65) Prior Publication Data
US 2016/0104280 A1    Apr. 14, 2016

(30) Foreign Application Priority Data
Jun. 28, 2013 (EP) .................................. 13174252

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/33* (2017.01); *G06T 7/344* (2017.01); *G06T 7/60* (2013.01);
(Continued)

(58) Field of Classification Search
CPC ......... G06T 7/0012; G06T 2207/10072; G06T 2207/30068; G06T 2207/30096
(Continued)

(56) References Cited

U.S. PATENT DOCUMENTS 8,761,470 B2 * 6/2014 Buelow ................ G06T 7/0012
345/156
8,908,944 B2 12/2014 Ishikawa et al.
(Continued)

FOREIGN PATENT DOCUMENTS

CN    102197413 A    9/2011
CN    102573650 A    7/2012

OTHER PUBLICATIONS

Qiu, Y. et al. "Correspondence recovery in 2-view mammography", Biomedical Imaging: Macro to Nano, 2004, IEEE International Symposium on Arlington, VA, Apr. 15-18, 2004, pp. 197-200.
(Continued)

*Primary Examiner* — Van D Huynh (57) ABSTRACT

The present invention provides for means for linking breast lesion locations across imaging studies. In particular, a generic three-dimensional representation of the female breast is used. Automatic translation of the lesion location into standard clinical terminology and aligning the breast model with individual patient images is comprised. Moreover, a mechanism for linking image locations showing a lesion to a location in the breast model is presented. If desired, a region of interest can be calculated by a region of interest definition module that predicts a region of interest of
(Continued)

a known lesion in terms of the breast model representation in a new imaging study.

20 Claims, 2 Drawing Sheets

(51) Int. Cl.
  *G06T 7/60* (2017.01)
  *G06T 7/33* (2017.01)
(52) U.S. Cl.
  CPC .............. *G06T 2207/10088* (2013.01); *G06T 2207/10116* (2013.01); *G06T 2207/10132* (2013.01); *G06T 2207/30068* (2013.01); *G06T 2207/30096* (2013.01)
(58) Field of Classification Search
  USPC ........................................................ 382/131
  See application file for complete search history.

(56) References Cited

U.S. PATENT DOCUMENTS

| | | | | |
|---|---|---|---|---|
| 2005/0027188 A1* | 2/2005 | Metaxas | ................ | A61B 5/055 600/410 |
| 2005/0096515 A1 | 5/2005 | Geng | | |
| 2006/0004278 A1* | 1/2006 | Giger | .................... | G06T 7/0012 600/408 |
| 2011/0077523 A1 | 3/2011 | Angott | | |
| 2012/0207368 A1* | 8/2012 | Ishikawa | ............... | G06T 7/0032 382/128 |
| 2012/0207373 A1* | 8/2012 | Grass | ..................... | A61B 6/025 382/131 |
| 2012/0230568 A1 | 9/2012 | Grbic et al. | | |
| 2012/0256920 A1* | 10/2012 | Marshall | ................ | A61B 6/025 345/420 |
| 2012/0308094 A1* | 12/2012 | Harish | .................. | G06F 19/321 382/128 |
| 2014/0348404 A1* | 11/2014 | Jerebko | ................ | G06T 7/0012 382/131 |

OTHER PUBLICATIONS

Rajagopal, V. et al., "Mapping microcalcifications between 2D mammograms and 3D MRI using a biomechanical model of the breast", Computational Biomechanics for Medicine, Chapter 3, 2010, pp. 17-28.

Reynolds, H.M. et al., "Mapping breast cancer between clinical X-Ray and MR Images", MICCAI 2010 Workshop Proceedings: Computational Biomechanics for Medicine, pp. 81-90, 2010.

Ruiter, N.V. et al., "Model-based registration of X-ray mammograms and MR Images of the female breast", Nuclear Science, IEEE Transactions, vol. 53, Issue 1, pp. 204-211, 2006.

Li-Hua, Wu et al., "Specific face model and expression animation model based on physical model". Journal of System Simulation, 13(3): 385-7, 2001.

* cited by examiner

LINKING BREAST LESION LOCATIONS ACROSS IMAGING STUDIES

CROSS-REFERENCE TO PRIOR APPLICATIONS

This application is the U.S. National Phase application under 35 U.S.C. § 371 of International Application No. PCT/EP2014/063018, filed on Jun. 20, 2014, which claims the benefit of European Patent Application No. 13174252.0, filed on Jun. 28, 2013. These applications are hereby incorporated by reference herein.

FIELD OF THE INVENTION

The present invention relates to breast imaging technology and the respective image data analysis. In particular, the present invention relates to a breast model based method for linking breast lesion locations, an imaging system for imaging a patient's breast, a computer program element and a computer-readable medium.

BACKGROUND OF THE INVENTION

Breast imaging for breast cancer screening and diagnostic work-up follows a multi-modality approach, including X-ray mammography and tomosynthesis, ultrasound, and Magnetic Resonance (MR) imaging. In order to completely characterize a lesion, it is essential for the radiologist to track individual lesions across multiple imaging studies and to structure the report on the level of individual lesions. In current practice, the radiologist has to visually identify corresponding lesions across imaging studies, since the patient positioning differs significantly between the different modalities, e.g., two projection images in X-ray mammography with a strongly compressed breast versus a three-dimensional Magnetic Resonance image of a freely hanging breast or an ultrasound image showing only part of the breast under examination.

Currently reports are made on an individual basis per imaging study, without linking to a generic reference frame. Consequently, when combining information from multiple reports, corresponding lesions need to be identified by the reader, which can be a challenging task. When reviewing a follow-up examination of a known lesion, the lesion needs to be searched and found "from scratch" which is time-consuming and, especially for the less experienced user, error-prone.

WO 2011/052515 A1 discloses an information processing apparatus for deforming an original image includes an obtaining unit configured to obtain a deformation rule by associating a movement of a feature area caused by deformation of the original image with the deformation, and a deformation unit configured to deform the original image in accordance with the deformation rule, using, as a condition of constraint, position information about a feature area of the target image and a corresponding area of the original image.

US 2005/0096515 A1 discloses a patient surface image therapy includes the steps of acquiring a three-dimensional reference image of an area to be treated, acquiring a three-dimensional treatment image of the area to be treated; matching the reference image to the treatment image; and calculating any differences between the reference image and the treatment images to generate patient repositioning parameters.

SUMMARY OF THE INVENTION

There may be a need to provide for improved breast imaging analysis.

The object of the present invention is solved by the subject-matter of the independent claims, wherein further embodiments are incorporated in the dependent claims. It should be noted that the following described aspects of the invention apply both for the breast model based method, the imaging system, the computer program element and the computer-readable medium. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method, unless explicitly mentioned to the contrary hereinafter. The skilled person gathers different orders and combinations of the method steps from disclosure presented herewith.

According to an exemplary embodiment of the invention, a breast model based method for linking breast lesion locations is presented. The method comprises the steps of receiving first image data of a first image of a patient's breast and providing coordinates of a lesion location in the first image of the patient's breast. Moreover, providing a predefined generic geometric breast model which is a representation of a female breast is comprised. Mapping the first image data with the predefined generic geometric breast model and linking the lesion location of the lesion in the first image with a corresponding location in the breast model thereby storing linking data is further comprised by this exemplary embodiment. Therein, the predefined generic geometric breast model uses/is based on normalized breast coordinates.

In this way, normalized coordinates can be assigned to images of different breast sizes, shapes and deformation states. In the context of the present invention the term normalized coordinates and/or normalized coordinate system may be understood as mathematical coordinates describing the breast. Different examples and embodiments thereof will be explained hereinafter.

The breast model may be a three-dimensional representation of a female breast for which different mathematical descriptions, i.e. different mathematical realizations, and different generic coordinate systems are described and contemplated herein. Further, the breast model may be seen as a generic reference which, amongst other features of the present invention and their interrelation, facilitates linking breast lesion locations across imaging studies. For this purpose the breast model may utilize or comprise normalized breast coordinates as will be explained in more detail hereinafter in the context of different embodiments.

Moreover, it is noted that the method may be embodied as a fully automated method or may also be embodied as partially requiring user input, for example, for the provision of the coordinates. If desired, the method may be completely computer-implemented such that upon receipt of the image data, the previously described method for linking breast lesion locations is launched and carried out automatically.

Furthermore, the presented method may be used for linking breast lesion locations within different breast images of one patient but may also be used for linking breast lesion locations within different breast images of different patients.

The step of mapping the first image with the predefined generic geometric breast model as used in the context of the present invention shall exemplarily be understood to comprise aligning the first image and the breast model in a geometrical manner. The same hold true, of course, for mapping the second image with the predefined generic geometric breast model, which can be carried out before or after the mapping of the first image. Further, detection algorithms and/or landmarks defined in or used by the breast model may be used during said mapping. Further details and aspects of detection algorithms and landmarks will be explained hereinafter with respect to different embodiments. Moreover, the step of mapping shall also be understood to comprise assigning corresponding pixels and/or regions of the respective image data, e.g. the first image data, and the predefined generic geometric breast model to each other. This alignment may be carried out electronically by pure calculation and/or by graphically overlapping the respective image/image data with the individually used breast model. In particular, landmarks defined within the breast model are assigned to parts of the first image as will become elucidated with further detailed embodiments described below. A corresponding comparison between the respective image and the breast model can also be comprised by the step of mapping.

If desired, the predefined generic geometric breast model can make use or can comprise normalized breast coordinates and/or may be represented by a parametric function such as for example a two-dimensional Gaussian function $G(x,y)$, restricted to a circular supporting domain D, parameterized either by Cartesian coordinates $(x,y)$ or polar coordinates $(r,\varphi)$. Different mathematical embodiments comprised by the present invention will be described hereinafter in more detail. However, we would like to point out that these are only examples and the skilled person may apply somewhat different coordinates without departing from the present teaching of the predefined generic geometric breast model as provided herein.

Furthermore, the linking data may be coordinates of the normalized breast coordinate system but can also be embodied as, for example, a graphically marked region within an image. Also other embodiments of the linking data shall be comprised by the present invention.

In a supplemented embodiment, the provided coordinates of the lesion in the first image are transformed into corresponding coordinates of the generic coordinate system of the breast model. Said coordinates of the generic coordinate system can be stored for a subsequent comparison with a second image. This will be elaborated in more detail with respect coordinates within standard clinical terminology including "upper outer quadrant and o'clock positions". In other words, the provided coordinates may describe the lesion location in terms of "upper outer quadrant and o'clock positions" and can then be transferred into the normalized breast coordinates used by the breast model. This facilitates comparability. More aspects and technical details of such a coordination transformation will be explained hereinafter.

The presented method advantageously allows for fast and effective linking breast lesion locations across different imaging studies. By this approach, a lesion marked by the radiologist in the first image can for example be assigned either a unique three-dimensional coordinate (if the lesion was marked in a three-dimensional image, or a pair of two-dimensional images), or a one-dimensional path, for example, when the lesion was marked only on one two-dimensional projection mammogram. The lesion location can be displayed using the generic coordinate system of the breast model for use in the report about the individual patient. Furthermore, the coordinates, which are comprised by the linking data, and which are generated for the lesion of the image study of the first image can be used to predict the lesion location on follow-up study of the same or a different modality. If desired, this can be indicated by, for example, marking a region of interest on the new image study. In another embodiment, if further processing of the lesion image is required, e.g., segmentation and feature analysis, this can be launched automatically, when the lesion is automatically located in the second image as described by the present invention. Rather than having to search for the lesion in the entire image data, in this way the search can be restricted to the region of interest and will thus be less prone to error and more effective regarding processing capacities. This provides for an advantage for the radiologist or another user examining the breast of the individual patient.

Figure 4:
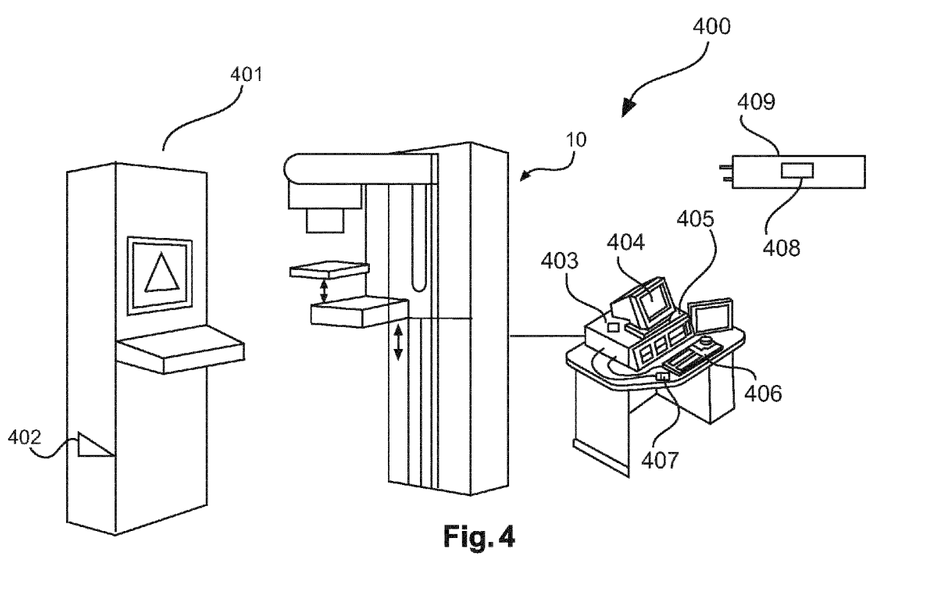
FIG. 4 schematically shows an imaging system according to an exemplary embodiment of the present invention.

Moreover, the step of providing coordinates as used in the context of the present invention shall be understood so as to comprise a pure automatic processing, for example by applying a detection algorithm, but also the active manual input provided by a user shall be understood to be comprised. For example, the keyboard 406 and/or the mouse 407 can be applied by the user to provide the coordinates of a lesion which he detects on the display 404. Subsequently, the provided coordinates of the lesion in the first image are transferred/transformed into corresponding coordinates in the generic coordinate system of the breast model. Said coordinates of the lesion in the generic coordinate system may be seen as the linking data which are stored.

The method of the present invention can be carried out offline and does not need any web access. In addition, it is emphasized that all steps as disclosed herein for the first image can be equally part of the present invention for the second image and any further image, e.g. a third, fourth, fifth image and so on.

According to another exemplary embodiment of the invention, the breast model comprises as anatomic landmarks at least one element chosen from the group comprising skin progression, breast nipple, pectoral muscle, anatomic orientation, the infra-mammary fold, and any combination thereof. Furthermore, the step of mapping comprises the step of aligning at least one anatomic landmark of the breast model with a corresponding anatomic landmark comprised by the first image.

This may be seen as an aspect/part of finding the coordinates of the lesion in the breast model coordinate system. The breast model may be displayed on a user interface such that the mapping can be carried out by the user, for example by spatially aligning the geometric representation of a normalized female breast with the first image of the individual patient's breast. However, also a purely calculation-based mapping may be carried out by the present invention such that for example the pectoral muscle identified in the first image is aligned or mapped with the pectoral muscle of the breast model. The same holds true for any other of the herein mentioned exemplary embodiments of anatomic landmarks that can be used as aspects or elements of the breast model.

According to another exemplary embodiment of the present invention, a method for automatically locating a lesion location in a second image is presented. This method comprises the steps of receiving second image data of a second image of a patient's breast, mapping the second image data with the predefined generic geometric breast model and automatically locating the lesion location in the second image based on the stored linking data.

Due to the automatically processed locating, it is possible to launch a further processing of the second, new image automatically and without the error-prone search of the radiologist within the second image for the second lesion.

This may enhance the reliability of the identification of the lesion within the second image based on the location in the first image.

In another exemplary embodiment of the present invention, image analysis is applied to the second image of the patient's breast thereby detecting at least one anatomic landmark of the breast model in the second image of the patient's breast.

The correspondingly detected anatomic landmark of the second image may then be used to map the second image to the breast model, which uses normalized breast coordinates and thus allows for a comparison or an identification of a breast lesion within two different images which may originate or may not originate from different image modalities. Consequently, a platform is provided by the present invention to easily identify lesions across a variety of different images and across a variety of different imaging modalities. Of course, this embodiment can also be applied to a third, fourth, fifth or even more images.

According to another exemplary embodiment of the invention, the method further comprises the step of visually indicating the lesion location in the second image, e.g., by drawing a graphical marker such as a circle or a rectangle around the lesion location.

According to another exemplary embodiment of the invention, the method may comprise the calculation of a region in the second image of the patient's breast based on the stored linking data.

Therefore, calculating may be seen as predicting. Based on the stored linking data may be understood as using the linked location in the breast model for identifying a lesion or a region of interest within the second and/or third and/or fourth image. Of course, all embodiments described herein may be applied to a large plurality of different images and are not restricted to first and second images. If desired, the calculated region of interest may be graphically marked on a display such that the user does not have to search for the lesion in the entire image data.

Again, it is noted that the previously mentioned embodiments which defined method steps with respect to the first image can also be carried out for the second image in the same way.

According to another exemplary embodiment of the present invention, an imaging system for imaging a patient's breast is presented, wherein the imaging system is configured to carry out a method according to any of the herein described method embodiments.

According to another exemplary embodiment, a computer program element for linking breast lesion locations is presented which program element, when being executed by a processor, is adapted to carry out the steps of receiving first image data of a first image of a patient's breast, receiving coordinates of a lesion location in the first image of the patient's breast, providing a predefined generic geometric breast model which is a representation of a female breast, mapping the first image data with the predefined generic geometric breast model and linking the lesion location of the lesion in the first image with a corresponding location in the breast model thereby storing linking data. Therein the predefined generic geometric breast model uses normalized breast coordinates, i.e. a normalized breast coordinate system.

The computer program element may be part of a computer program, but it can also be an entire program by itself. For example, the computer program element may be used to update an already existing computer program to get to the present invention.

According to another exemplary embodiment of the invention, a computer-readable medium having stored the computer program element as described before is presented.

The computer-readable medium may be seen as a storage medium, such as for example a USB stick, a CD, a DVD, a data storage device, a hard disk, or any other medium on which a program element as described above and below can be stored.

It may be seen as a gist of the invention to provide for a solution which helps the radiologist to track individual lesions across multiple imaging studies and to structure the report on the level of individual lesions. The herein presented solution may comprise a generic three-dimensional representation/model of the female breast comprising landmarks as for example the breast nipple or the pectoral muscle. Also the step of constructing such a model may be part of the present invention. Each image may be roughly aligned with the model and landmark-region mapping between the two is carried out. A lesion found in a first image study can be localized in the model representation. The localization may be stored. From this stored location and the region mapping between the model and the next image study, the location of the same lesion can be roughly estimated and/or shown in this next image.

If desired, the anatomic landmarks used may depend on the imaging modality of the respective image. The following non limiting examples are given:
a. MRI: Nipple, skin-surface, pectoral muscle, patient orientation,
b. Mammography: Nipple, projected skin-line, pectoral muscle (not always visible in cranio-caudal views), patient orientation (from information stored in DICOM tags: view-position, and
c. Tomosynthesis: Nipple, compressed breast surface, pectoral muscle, patient orientation:

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

In principle, identical parts are provided with the same reference symbols in the figures.

DETAILED DESCRIPTION OF EMBODIMENTS

In the following, aspects about the breast model and the used coordinate systems will be described in detail. The following aspects are applicable to all embodiments depicted in FIGS. 1 to 4. It should be noted that all steps described for the first image are equally applicable and disclosed herewith for the second image and any further image.

In a first embodiment, the breast model is a generic breast model and is represented by a parametric function. For example, a two-dimensional Gaussian function (G(x,y)), restricted to a circular supporting domain D, parameterized either by Cartesian coordinates (x,y) or polar coordinates (r,φ) is a possible embodiment. Moreover, the anatomic structures can be presented by the apex, i.e. the nipple position, the flat circular domain with the z-coordinate=0 (posterior end of breast; pectoral muscle), the surface defined by the Gaussian function values G(x,y) (i.e. the skin surface), and by aligning the axis orientations with patient coordinates. For example, the following terminology may be used. Positive x=superior, negative x=inferior, positive y=medial, negative y=lateral.

Furthermore, a mapping between the clinically used breast coordinates and the technical coordinates, i.e. the mathematical coordinates or so called normalized breast coordinates, used to define the generic breast model can be established by the embodiments described herein. Some examples are given in the following:

a. The anterior-posterior extension defined by the most posterior (=0) and the most anterior z-coordinate (the maximal elevation=G(0,0)) is split into three classes ([0,1/3 G(0,0)): "posterior", [1/3 G(0,0), 2/3 G(0,0)): "middle", [2/3 G(0,0), G(0,0)]: "anterior".

b. The commonly used o'clock positions can be directly derived from the φ-coordinate of the polar representation of the base-plate.

c. The quadrants are identified by the sign of the x, and y-coordinates (for the right breast):
 i. Positive x, positive y: upper inner quadrant
 ii. Positive x, negative y: lower inner quadrant
 iii. Negative x, positive y: upper outer quadrant
 iv. Negative x, negative y: lower outer quadrant.

In order to assign the coordinates defined before to images of an individual patient's breast, image analysis techniques can be applied by the present invention to detect the anatomic structures used for the definition of the generic coordinate system of the breast model. Depending on the imaging modality, a different set of landmarks can be detected as has been described before. After linking the detected anatomic landmarks to the corresponding structures of the breast coordinate system, the full coordinate system can be mapped onto the image data by for example interpolation, using for example thin plate spline (TPS) interpolation. In addition, content from image modalities or acquisitions, like ultrasound or diagnostic X-rays, that don't allow for an automatic detection of landmarks, can be linked to the breast model employing the clinically used breast coordinate system.

Figure 1:
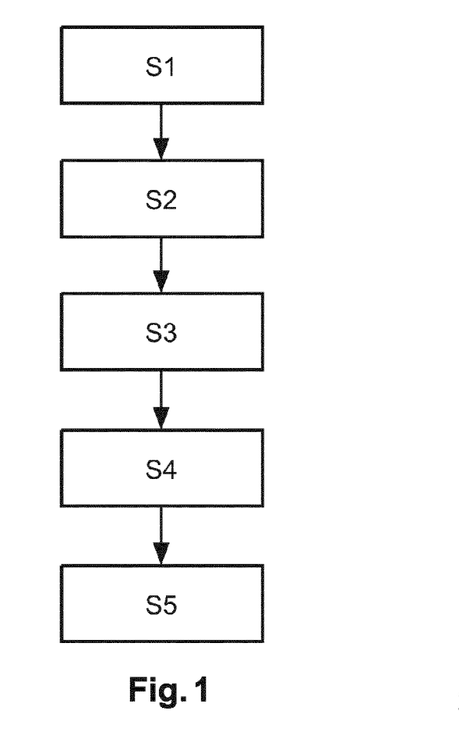
FIG. 1 shows a flow diagram of a method according to an exemplary embodiment of the present invention.

FIG. 1 schematically shows a flow diagram of a method that can be used for linking breast lesion locations across imaging studies. The method shown in FIG. 1 allows for lesion tracking across different imaging modalities, as will become clear from the following explanations. In particular, a generic three-dimensional representation of the female breast, i.e. the breast model, is used as a generic reference. Automatic translation of the lesion location into standard, non-mathematical clinical terminology can be comprised by the embodiment shown within FIG. 1. A step of aligning the model, i.e. the schematic representation, with individual patient images can be comprised. Moreover, a mechanism for linking image locations showing a lesion to a location in the breast model can be comprised. If desired, a region of interest can be calculated by a region of interest definition module predicting a region of interest of a known lesion in terms of the breast model representation in a new imaging study, i.e. in a second image. These advantages and aspects will become apparent from the explanations of the steps S1 to S5 depicted in FIG. 1.

The receipt of first image data of a first image of a patient's breast is depicted in step S1. Different ways of providing coordinates of a lesion location in the first image of the patient's breast can realize embodiments of step S2 of FIG. 1. Further, in step S3, said predefined generic geometric breast model is provided and used wherein the model is a representation of the female breast. After the provision of the breast model in step S3, a mapping step S4 is carried out for aligning the first image data with the predefined generic geometric breast model. Various different sub-steps or additional steps of the mapping step may be comprised and are explained in detail herein. The step of linking the lesion location of the lesion in the first image with a corresponding location in the breast model thereby storing linking data is carried out subsequently in step S5. Therein the predefined generic geometric breast model uses normalized breast coordinates as described in detail herein, i.e. a normalized breast coordinate system.

In a further example of the method of FIG. 1, a detection algorithm is applied to the first image thereby detecting a first anatomic landmark in the first image. In yet another example, shifting and/or rotating the predefined generic geometric breast model such that a part of the model which corresponds to the detected first anatomic landmark of the first image is aligned with the detected first anatomic landmark in the first image is carried out. In yet another example of the method of FIG. 1, the step of scaling either the breast model or the first image such that the size of the breast model corresponds to the size of the breast in the first image can be carried out. If desired, the breast model may be represented as a mesh structure and the step of shifting mesh vertices of the breast model to skin points identified in the patient's image can be carried out. Moreover, applying an elastic model thereby minimizing a mesh deformation energy is another example. This may be seen as adjusting inner vertices of the breast model along with assigned breast coordinates.

Figure 2:
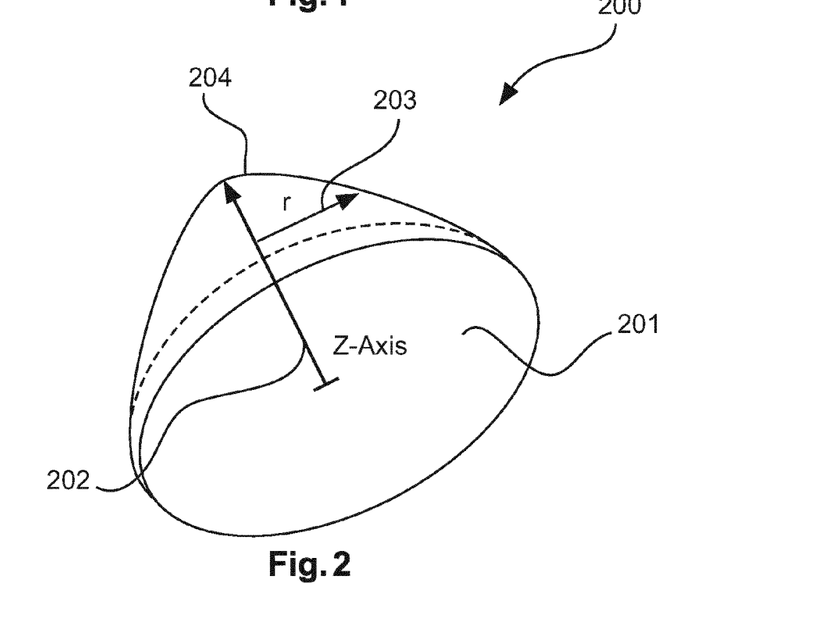
FIG. 2 schematically shows a visual representation of a breast model according to an exemplary embodiment of the present invention.

FIG. 2 schematically shows a visual representation of a generic breast model according to an exemplary embodiment of the present invention. This predefined generic geometric breast model uses normalized breast coordinates as will be explained in the following. The breast model 200 may be seen as a generic model of the breast as it uses normalized breast coordinates. For example, a triple of numbers (r,φ,z) can be used, where the dead value in the posterior-anterior direction, e.g. the orthogonal distance from pectoral muscle to nipple and ranges from 0 (pectoral muscle) to 1 (nipple level). FIG. 2 shows z-axis by reference sign 202 whereas the radius r is depicted with 203. The nipple level is depicted by 204. Thus, breast model 200 is a geometrical representation of a breast 201 which allows for linking breast lesion locations across imaging studies. The line connecting the mammilla with a suitable point on the pectoral muscle surface, e.g. a point such that the connecting line is normal to the pectoral muscle, can be used as a reference for the second parameter r, which may vary from 0 to 1. It may indicate the radial distance on a disk perpendicular to the line. 0 may indicate a position on the central line and 1 may indicate a position on the breast surface. Together with a polar angle φ on the circular plane (disk) all points can be uniquely identified. Also other values or limits may be used. For example, the polar coordinate φ starts at 0 indicating locations directly above the nipple position and then increases counter clockwise.

In order to assign breast coordinates to each point in a breast image, the breast model such equipped with coordinates can be aligned with the actual patient's image according to an embodiment of the present invention. In case the breast image is a volumetric (3D) image, such as an MRI scan of the breast, each voxel in the image corresponds to a unique coordinate. In case the image is a 2D projection image of the breast, such as a mammogram, each pixel in the image corresponds to a viewing ray through the breast. Consequently, each pixel corresponds to a 1-dimensional set of anatomic positions and thus to a line in the breast coordinate space.

However, also other nomenclatures or other definitions for the normalized breast coordinate system according to other embodiments are possible without departing from the present invention.

In the following, an example which is based on FIG. 1 will be described. First, a detection algorithm or interactive tools are applied to detect anatomic landmarks in the first image. Then, the breast model is shifted and/or rotated such that the model part corresponding to the pectoral muscle is aligned with the pectoral muscle detected in the image. Scaling is applied in order to adjust the size of the model to the actual patient's breast size. Assuming the model is represented as a mesh structure, the mesh vertices corresponding to skin points are shifted to the skin points identified in the patient's image which introduced a non-rigid deformation into the model. An elastic model minimizing the mesh formation energy is applied in order to adjust the inner vertices of the breast model along with the assigned breast coordinates. Voxel locations that do not coincide with a mesh vertex can be assigned a breast coordinate by tri-linear interpolation between the coordinates on the mesh vertices. In this way, normalized coordinates can be assigned to images of different breast sizes, shapes and deformation states.

Figure 3:
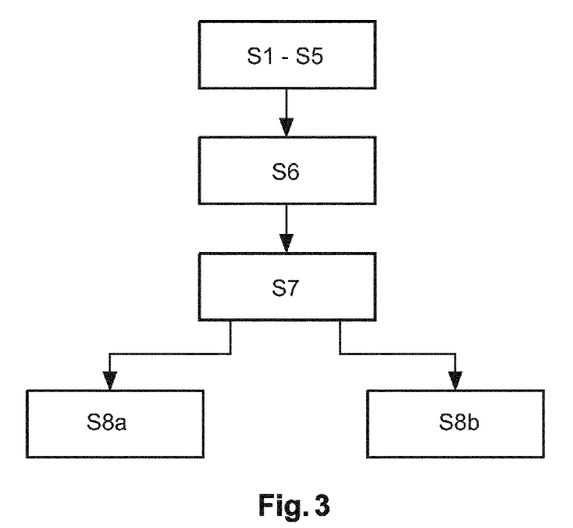
FIG. 3 shows a flow diagram of a method according to an exemplary embodiment of the present invention.

FIG. 3 shows another flow diagram of an exemplary method according to an embodiment of the present invention. Regarding steps S1 to S5, it is referred to the description as been previously provided for FIG. 1. In addition to the aspects disclosed for the embodiment of FIG. 1, the embodiment of FIG. 3 may also comprise and entail the aspects and features described before in the context of FIG. 2. In particular, a second image is received by step S6. Furthermore, mapping is carried out for the second image data with the predefined generic geometric breast model in step S7. As has been explained in detail before, various different aspects may be comprised by the mapping step, which holds also true for mapping the second image data with the predefined generic geometric breast model. After step S7, two different flow directions are shown by FIG. 3. In detail, in step S8a, the location of the lesion is automatically located in the second image based on the stored linking data. Alternatively or additionally, a region of interest in the second image of the patient's breast can be calculated based on the stored linking data, which is depicted by step S8b.

FIG. 4 schematically shows an imaging system 400 for imaging a patient's breast according to an exemplary embodiment of the present invention. The imaging system 400 is adapted to carry out the breast model based method for linking breast lesion locations according to any embodiment desired herein. Therein the predefined generic geometric breast model uses normalized breast coordinates, i.e. a normalized breast coordinate system.

An imaging device 401 is depicted which may comprise a computer program element 402. Computer program element 402, when being executed by a processor, is adapted to carry out the method of the present invention. However, alternatively or in addition, a computer program element 403 can also be stored on the calculation unit 405 for carrying out the method of the present invention. The computer shown within FIG. 4 comprises a display 404, a keyboard 406 and a mouse 407 by means of which the user may provide for the coordinates of a lesion location in the first image of the patient's breast. A USB stick 409 is shown as well in FIG. 4 as an exemplary embodiment of a computer-readable medium. A program element for carrying out the method of the present invention is stored on the USB stick and is shown with reference sign 408.

The imaging system using the present invention is thus to be seen as a platform to easily identify lesions across a variety of different images and across a variety of different imaging modalities. The imaging system 400 or only the calculation unit 405 may carry out the steps of providing the breast model, mapping and linking and storing the linking data as described herein. Moreover, data access can be provided to the imaging system 400 or only to the calculation unit 405 to transmit the previously determined and stored linking data. After imaging system has generated a second breast image, the following steps may then be carried out by the imaging system 400 and/or the calculation unit 405. Receiving the second image data of the a second image of a patient's breast, mapping the second image data with the predefined generic geometric breast model; and automatically locating the lesion location in the second image based on the stored linking data. This may enhance the reliability of the identification of the lesion within the second image based on the location in the first image.

Furthermore, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It is noted that the previously mentioned embodiments with respect to the figures define method steps with respect to the first image. However, it is disclosed herewith that said method steps can also be carried out for the second image in the same way unless explicitly stated differently.

It has to be noted that embodiments of the invention are described with reference to different subject matters. In particular, some embodiments are described with reference to method type claims whereas other embodiments are described with reference to the device type claims. However, a person skilled in the art will gather from the above description that, unless otherwise notified, in addition to any combination of features belonging to one type of subject matter also any combination between features relating to different subject matters is considered to be disclosed with this application.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an"

does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A breast model based method for linking breast lesion locations, the method comprising:
   receiving first volumetric image data of a first image of a patient's breast,
   providing coordinates of a lesion location in the first image of the patient's breast;
   providing a predefined generic three-dimensional (3D) geometric breast model that is a representation of a female breast;
   wherein the predefined generic 3D geometric breast model is based on a normalized 3D breast coordinate system;
   mapping the first volumetric image data with the predefined generic 3D geometric breast model; and
   linking the lesion location in the first image with a corresponding location in the predefined generic 3D geometric breast model thereby providing linking data;
   receiving second volumetric image data of a second image of a patient's breast;
   mapping the second image data with the predefined generic 3D geometric breast model;
   automatically determining a location of the lesion in the second image based on the linking data,
   automatically locating a region of interest of the second volumetric image data corresponding to the determined location of the lesion in the second image, and
   automatically displaying one or more images corresponding to the located region of interest of the second volumetric image data.

2. The method of claim 1, wherein the breast model comprises as anatomic landmarks for mapping at least one element chosen from the group comprising: skin progression, breast nipple, pectoral muscle, anatomic orientation, infra-mammary fold, and any combination thereof, and wherein the mapping comprises aligning at least one anatomic landmark of the breast model with a corresponding anatomic landmark in the first image.

3. The method of claim 1, further comprising applying at least one detection algorithm to the first image thereby detecting at least one anatomic landmark in the first image.

4. The method of claim 3, further comprising shifting and/or rotating the predefined generic geometric breast model such that a part of the model that corresponds to the detected at least one anatomic landmark of the first image is aligned with the at least one detected anatomic landmark in the first image.

5. The method of claim 1, further comprising scaling either the breast model or the first image such that the size of the breast model corresponds to the size of the breast of the first image.

6. The method of claim 1, wherein the breast model comprises an elastic mesh structure, the method further comprising shifting inner mesh vertices to skin points in the first image to minimize a mesh deformation energy.

7. The method of claim 1, the method further comprising automatically performing segmentation or image analysis of the second image data at or around the determined lesion location in the second image.

8. The method of claim 1, wherein the mapping of the second image data includes applying image analysis to the second image of a patient's breast thereby detecting at least one anatomic landmark of the breast model in the second image of the patient's breast.

9. The method of claim 1, wherein the first image is of a first imaging modality and the second image is of a second, different imaging modality.

10. An imaging system for imaging a patient's breast, wherein the imaging system is configured to execute the method of claim 1.

11. A non-transitory computer readable medium that comprises a computer program element for linking breast lesion locations which program element, when being executed by a processor, causes the processor to:
   receive first volumetric image data of a first image of a patient's breast,
   receive coordinates of a lesion location in the first image of the patient's breast;
   provide a predefined generic three-dimensional (3D) geometric breast model that is a representation of a female breast;
   wherein the predefined generic 3D geometric breast model is based on a normalized breast coordinate system;
   map the first image data with the predefined generic geometric breast model;
   link the lesion location of the lesion in the first image with a corresponding location in the breast model thereby providing linking data,
   receive second image data of a second image of a patient's breast,
   map the second image data with the predefined generic geometric breast model, and
   determine a location of the lesion in the second image based on the stored linking data,
   locate a region of interest of the second volumetric image data corresponding to the determined location of the lesion in the second image, and
   display one or more images corresponding to the located region of interest of the second volumetric image data.

12. The medium of claim 11, wherein the breast model comprises as anatomic landmarks for mapping at least one element chosen from the group comprising: skin progression, breast nipple, pectoral muscle, anatomic orientation, infra-mammary fold, and any combination thereof, and wherein the mapping comprises aligning at least one anatomic landmark of the breast model with a corresponding anatomic landmark in the first image.

13. The medium of claim 11, wherein the program element causes the processor to apply at least one detection algorithm to the first image to detect at least one anatomic landmark in the first image.

14. The medium of claim 13, wherein the program element causes the processor to shift and/or rotate the predefined generic geometric breast model such that a part of the model that corresponds to the detected at least one anatomic landmark of the first image is aligned with the at least one detected anatomic landmark in the first image.

15. The medium of claim 11, wherein the program element causes the processor to scale either the breast model or the first image such that the size of the breast model corresponds to the size of the breast of the first image.

16. The medium of claim 11, wherein the breast model comprises an elastic mesh structure, and the program element causes the processor to shift inner mesh vertices to skin points in the first image to minimize a mesh deformation energy.

17. The medium of claim 11, wherein the program element causes the processor to perform segmentation or image analysis in the second image data at or around the determined lesion location in the second image.

18. The medium of claim 11, wherein the program element causes the processor to apply image analysis to the second image of a patient's breast to detect at least one anatomic landmark of the breast model in the second image of the patient's breast.

19. The medium of claim 11, wherein the first image is of a first imaging modality and the second image is of a second, different imaging modality.

20. The medium of claim 11, wherein the program element causes the processor to concurrently display images of the region of interest in the first image and in the second image.

* * * * *